United States Patent [19]

Hitomi

[11] Patent Number: 4,911,378
[45] Date of Patent: Mar. 27, 1990

[54] DRAG MECHANISM FOR A SPINNING REEL

[75] Inventor: Yasuhiro Hitomi, Sakai, Japan

[73] Assignee: Shimano Industrial Company Limited, Osaka, Japan

[21] Appl. No.: 215,561

[22] Filed: Jul. 6, 1988

[30] Foreign Application Priority Data

Jun. 13, 1988 [JP] Japan .............................. 63-78020[U]

[51] Int. Cl.⁴ .............................................. A01K 89/02
[52] U.S. Cl. ...................................... 242/246; 242/319
[58] Field of Search ...................... 242/84.5 R, 84.5 A, 242/84.51 R, 84.51 A, 217, 312, 246, 245, 302

[56] References Cited

U.S. PATENT DOCUMENTS

| | | | |
|---|---|---|---|
| 3,027,114 | 3/1962 | Grieten | 242/84.5 R X |
| 3,743,207 | 7/1973 | McMickle | 242/84.51 A X |
| 4,222,534 | 9/1980 | Ishida | 242/84.2 R |
| 4,601,437 | 7/1986 | Yoshikawa | 242/84.5 A |
| 4,742,974 | 5/1988 | Furomoto | 242/217 |
| 4,796,828 | 1/1989 | Councilman | 242/84.5 A |

FOREIGN PATENT DOCUMENTS

| | | |
|---|---|---|
| 52-26469 | 6/1977 | Japan . |
| 63-68773 | 5/1988 | Japan . |
| 2199221 | 7/1988 | United Kingdom ........... 242/84.5 R |

Primary Examiner—Katherine A. Matecki
Attorney, Agent, or Firm—Stevens, Davis, Miller & Mosher

[57] ABSTRACT

A drag mechanism for a spinning reel is provided which includes drag members housed in a cavity provided at the center of the front surface of a trunk of a spool. An adjuster for adjusting a braking force of each drag member is provided with a cylindrical portion having an annular slidable surface. A sealing member mounted on the front surface of the spool is brought into contact with the slidable surface so as to seal the cavity.

4 Claims, 1 Drawing Sheet

DRAG MECHANISM FOR A SPINNING REEL

FIELD OF THE INVENTION

The present invention relates to a drag mechanism for a spinning reel used for fishing, and more particularly, to a drag mechanism for a spinning reel, which is provided between a spool shaft and a spool rotatably supported thereto with a plurality of drag members for applying a braking force against rotation of the spool and an adjuster for adjusting the braking force, thereby applying the braking force against rotation of the spool with respect to the spool shaft.

BACKGROUND OF THE INVENTION

Generally, the above type of drag mechanism for a spinning reel, as disclosed in Japanese Utility Model Publication Gazette No. Sho 52-26469, is constructed such that at the center of the front surface of the spool there is provided a cavity housing therein a plurality of drag members and the adjuster is screwably mounted to the front end of the spool shaft, with the adjuster being operated to bring the drag members into axial press-contact with the spool, thereby adjusting the braking force against rotation of the spool.

As disclosed in Japanese Utility Model Laid-Open Gazette No. Sho 63-68773, a plurality of drag members are interposed between the outer peripheral portion at the front surface of the spool and the adjuster screwable therewith, and on the outer peripheral portion of the front side drag member is mounted an annular sealing member having a lip disposed opposite to the front surface of the spool. As a result, the adjuster screwably moves in a forward direction to bring the lip into contact with the front surface of the spool, thereby preventing rain water or dust from entering between the drag member and the front surface of the spool.

The latter reel, which is provided at the outer peripheral portion of the front surface of the spool with the drag members so that the outer peripheral portion of the spool is utilized to urge the drag members, is required to have a larger diameter, thereby creating a problem in that the manufacturing cost of the reel is high to that extent. Particularly, the sealing member is mounted opposite to the front surface of the spool and the adjuster screws in a forward direction to bring the lip in contact with the front surface of the spool, i.e., the sealing member moves together with the drag member. As a result, the braking force of the drag member changes and the contact resistance of the lip applied to the front surface of the spool changes greatly. Also, the lip contacts the outer periphery of the front surface of the spool at its larger contact area. Hence, the sealing member greatly affects the braking force, and a problem is created in that the braking force is not smoothly changed and adjustment of the braking force affects the sealing effect.

SUMMARY OF THE INVENTION

In view of the above problem, the present invention is designed. An object thereof is to provide a drag mechanism for a spinning reel, which (1) includes a simple modification of a spool and an adjuster of a conventional spinning reel so as to protect the drag mechanism from being affected by rain water or dust, (2) minimizes the influence of a sealing member on the braking force, and (3) reliably seals the drag members regardless of adjustment of the braking force.

The drag mechanism for the spinning reel of the invention is provided between a spool shaft and a spool rotatably supported thereto with a plurality of drag members and an adjuster for adjusting a braking force thereof. The spool is provided at the center of its front surface with a cavity in which the drag members are contained. The adjuster is provided with a cylindrical portion having at its outer periphery an annular slidable surface and sleeved onto the spool shaft. The cylindrical portion enters at its inner end into the spool and extends rearwardly from the front surface. A sealing member is mounted at the front surface of the spool and in contact with the annular sliding surface.

Since the sealing member mounted on the front surface of the spool contacts the annular slidable surface of the adjuster, even when the braking force of the drag member varies, the sealing member always contacts the slidable surface under constant contact pressure, whereby the contact resistance of the sealing member is unchanged and the influence hereof on the braking force is minimized. Also, the sealing member in contact with the slidable surface under the unchanged contact pressure ensures reliable sealing without changing the sealing efficiency.

The above and further objects and novel features of the invention will be more fully apparent from the following detailed description when the same is read in connection with the accompanying drawings.

DETAILED DESCRIPTION OF THE PREFERRED EMBODIMENT

Figure 1:
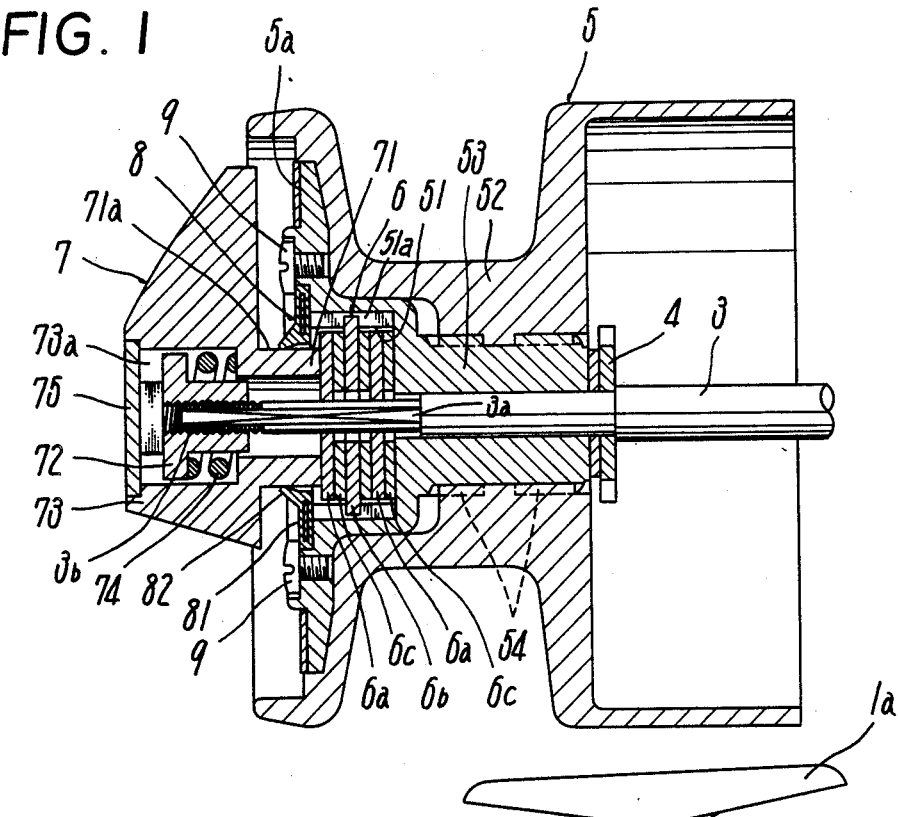
FIG. 1 is an enlarged sectional view of an embodiment of a drag mechanism of a spinning reel according to the invention, showing the principal portion thereof.
Figure 2:
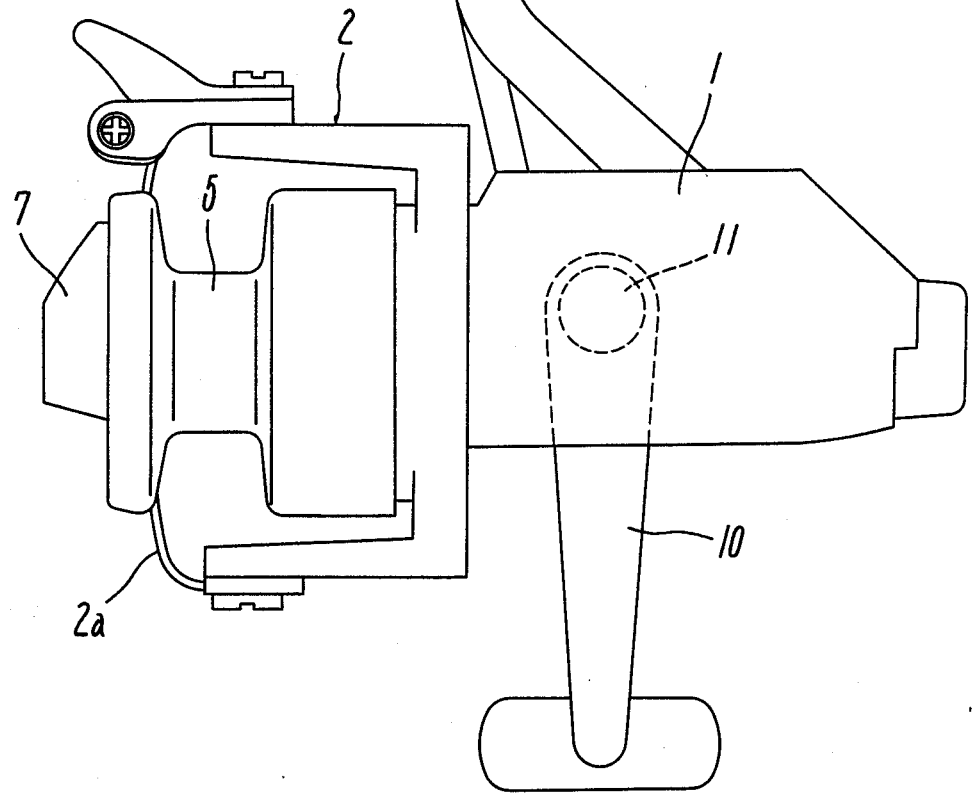
FIG. 2 is a front view of the entire spinning reel shown in FIG. 1.

A spinning reel incorporating the drag mechanism of the invention, as generally shown in FIG. 2, is constructed such that rotary frame 2 having a bail arm 2a is rotatably supported at the front of a reel body 1 having at its upper surface a mounting leg 1a through which reel body 1 is mounted on a fishing rod. A handle shaft 11 having a handle 10 is supported to reel body 1, and a master gear (not shown) is fixed to handle shaft 11. A cylindrical driving shaft (not shown) having a pinion engageable with the master gear is disposed longitudinally of reel body 1 and rotatably supported thereto. Rotary frame 2 is mounted to the driving shaft so as to be rotated by operating handle 10. A spool shaft 3 (see FIG. 1) extending longitudinally of reel body 1 is fitted into the driving shaft and supported to reel body 1 to be nonrotatable and axially movable only in a predetermined range. A spool 5 is rotatably supported to spool shaft 3.

The drag mechanism of the invention serves to apply a braking force against rotation of spool 5 with respect to spool shaft 3. Spool 5 is restrained from axial movement by a stopper 4 provided at spool shaft 3. The drag mechanism comprises a plurality of drag members 6a and 6b and an adjuster 7 for adjusting the braking force. Handle 10 is operated to rotate rotary frame 2, and spool shaft 3 is moved longitudinally of reel body 1 through a reciprocation mechanism for spool shaft 3 hosed in reel body 1. A fishing line can be wound on the outer periphery of a trunk of spool 5. When a hooked fish pulls the line with a large pulling force, spool 5 rotatably slips in the reverse direction to the line-winding direction, thereby preventing the line from being cut.

Accordingly, adjuster 7 adjusted the braking force corresponding to the proof stress of the particular line being used, and when rain water or the line becomes attached to drag members 6a and 6b, the adjusted braking force is subject to variation.

An embodiment of the invention, shown in FIG. 1, is directed to a drag mechanism provided at the center of the front surface of a trunk 5a with a cavity 51, in which drag members 6a and 6b are contained, and cavity 51 is sealed by a sealing member to be described in detail below.

Drag members 6a are supported non-rotatably relative to spool shaft 3 and drag member 6b is supported non-rotatably relative to spool 5, with linings 6c being interposed between drag members 6a and 6b.

Spool shaft 3 is provided at its front portion with a portion 3a having a non-round section and a screw thread 3b. Drag members 6a at the spool shaft side are supported axially movably only to non-round portion 3a. A plurality of engaging grooves 51a are provided at the inner periphery of cavity 51 and drag member 6b at the spool side is supported non-rotatably and axially movably only relative to trunk 5a of spool 5.

Adjuster 7 is screwably attached to screw thread 3b at spool shaft 3. Adjuster 7, s shown in FIG. 1, comprises a nut 72 screwable with screw thread 3b, a thumb nut 73 fitted non-rotatably and axially movably relative to nut 72, and a transmitting spring 74 interposed between nut 72 and thumb nut 73. Thumb nut 73 is rotatably operated and nut 72 rotates together with nut 73 and screws in a forward direction, so that its movement is transmitted to thumb nut 73, thereby bringing drag members 6a and 6b into press-contact with spool 5. Alternatively, adjuster 7 may omit transmitting spring 74 and integrate nut 72 with thumb nut 73.

In either embodiment, adjuster 7 is provided at a side opposite to front surface 5a of spool 5 with a cylindrical portion 71 having at its outer periphery an annular slidable surface 71a and sleeved onto the front portion of spool shaft 3. Cylindrical portion 71 enters at its inner end into spool 5 rearwardly from a location at the front thereof. At the front of spool 5 is mounted a sealing member 8 abutting against annular slidable surface 71a.

Sealing member 8 is annular and has at its outer periphery a disc-like base 81 having a metal plate inserted therein and at its inner periphery a thin and elastically deformable lip 82. Base 81 is pressed to front surface 5a of spool 5 by the heads of a plurality of headed screws 9 screwable with threaded bores provided at front spool surface 5a, with lip 82 lightly contacting slidable surface 71a. In addition, lip 82 is preferably oriented forwardly as shown, and sealing member 8 is formed preferably of rubber, but may be formed of synthetic resin.

The drag mechanism constructed as described above adjusts the braking force for spool 5 such that adjuster 7 is rotated to move with respect to spool shaft 3 and to press the drag members to adjust the braking force applied against rotation of spool 5, at which time sealing member 8 is stationary and not axially pushed, whereby the contact resistance of sealing member 8 applied to annular slidable surface 71 does not vary. Also, sealing member 8 makes contact at its inner periphery having a small contact area with adjuster 7 and seals cavity 51. Hence, sealing member 8 scarcely affects the braking force, which can be changed smoothly.

Drag members 6a and 6b contained in cavity 51 sealed by sealing member 8 are protected from rain water or dust which would otherwise enter therein.

In addition, spool 5 in the illustrated embodiment is divided into an outer member 52 at the outer periphery side on which a fishing line is wound and an inner member 53 at the inner periphery side housing therein the drag members and supported to spool shaft 3. Outer member 52 is formed of synthetic resin, and inner member 53 of aluminum alloy.

Inner member 53 is provided at its front side with a flange 53a and is inserted into outer member 52 when molded and coupled integrally therewith. Also, a plurality of splines 54, are provided at the coupling portion between outer member 52 and inner member 53, thereby restraining both the members from rotation relative to each other and axially relative movement. Alternatively, spool 5 may include an integrated one-piece structure encompassing its outer peripheral side and its inner peripheral side.

In addition, FIG. 1., reference numeral 75 designates a lid for closing a non-round bore 73a and serving also as a name plate.

As seen from the above, the drag mechanism of the invention simply seals by sealing member 8 cavity 11, thereby protecting the drag members from rain water or dust. Also, sealing member 8, which contacts annular slidable surface 71a of adjuster 7, can seal cavity 51 always at a predetermined contact pressure regardless of adjustment of the braking force by the adjuster, thereby keeping the contact resistance of sealing member 8 unchanged and minimizing the influence thereof on the braking force because of sealing through a small inner peripheral portion, thus enabling the braking force to be smoothly changed.

While an embodiment of the invention has been shown and described, the invention is not limited to the specific construction thereof illustrated in the specification since the shown embodiment is merely exemplary and the invention is defined only by the scope of the attached clams.

I claim:
1. A spinning reel, comprising:
   a spool shaft;
   a spool supported on said spool shaft to be rotatable relative thereto, said spool including a trunk portion having a front surface and a cavity positioned at a center of said front surface;
   a drag mechanism for applying a braking force against rotation of said spool with respect to said spool shaft, said drag mechanism comprising a plurality of drag members positioned in said cavity for applying said braking force against rotation of said spool with respect to said spool shaft, an adjuster sleeved onto an outer periphery of said spool shaft, said adjuster comprising a bias force applying means for applying an adjustable biasing force against said drag members to adjust said braking force applied by said drag members to said spool, said adjuster comprising a cylindrical portion having at its outer periphery an annular slidable contact surface, said cylindrical portion comprising an inner end which projects into said cavity of said spool at said front surface in a direction toward said drag members; and a sealing member disposed at said front surface of said spool, said sealing member comprising contact means for contacting said annular slidable contact surface of said cylindrical portion to thereby seal said cavity.

2. A spinning reel according to claim 1, wherein said inner end of said cylindrical portion of said adjuster contacts a front-most one of said drag members positioned in said cavity, and said bias force applying means applies an adjustable bias force to said drag members responsive to said adjuster being operated to undergo movement relative to said spool shaft in a direction toward said drag members such that said movement is transmitted to said drag members.

3. A spinning reel according to claim 1, wherein said sealing member comprises a substantially disc-shaped base having a center bore and said contact means comprises a lip extending radially inwardly from said center bore of said base and being elastically deformable, said base of said sealing member being fixed to said front surface of said spool.

4. A spinning reel according to claim 3, wherein said lip of said sealing member is inclined with respect to said base in a direction away from said drag members.

* * * * *